Sept. 13, 1938.  H. L. BLYDENBURGH  2,130,116
LAWN MOWER HITCH
Filed Sept. 14, 1936   2 Sheets-Sheet 2
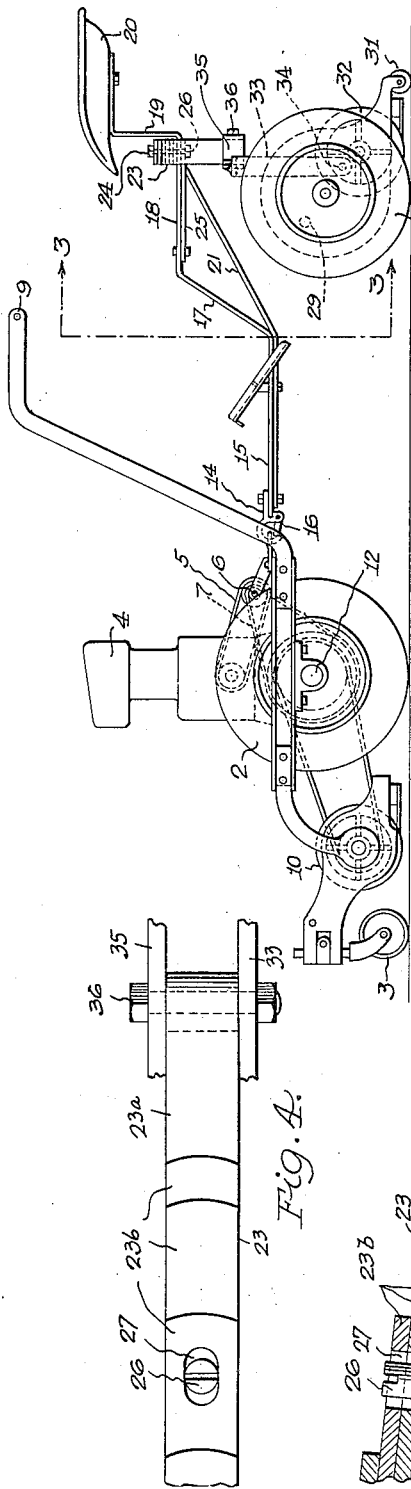
INVENTOR
Harold L. Blydenburgh,
BY
ATTORNEYS Patented Sept. 13, 1938

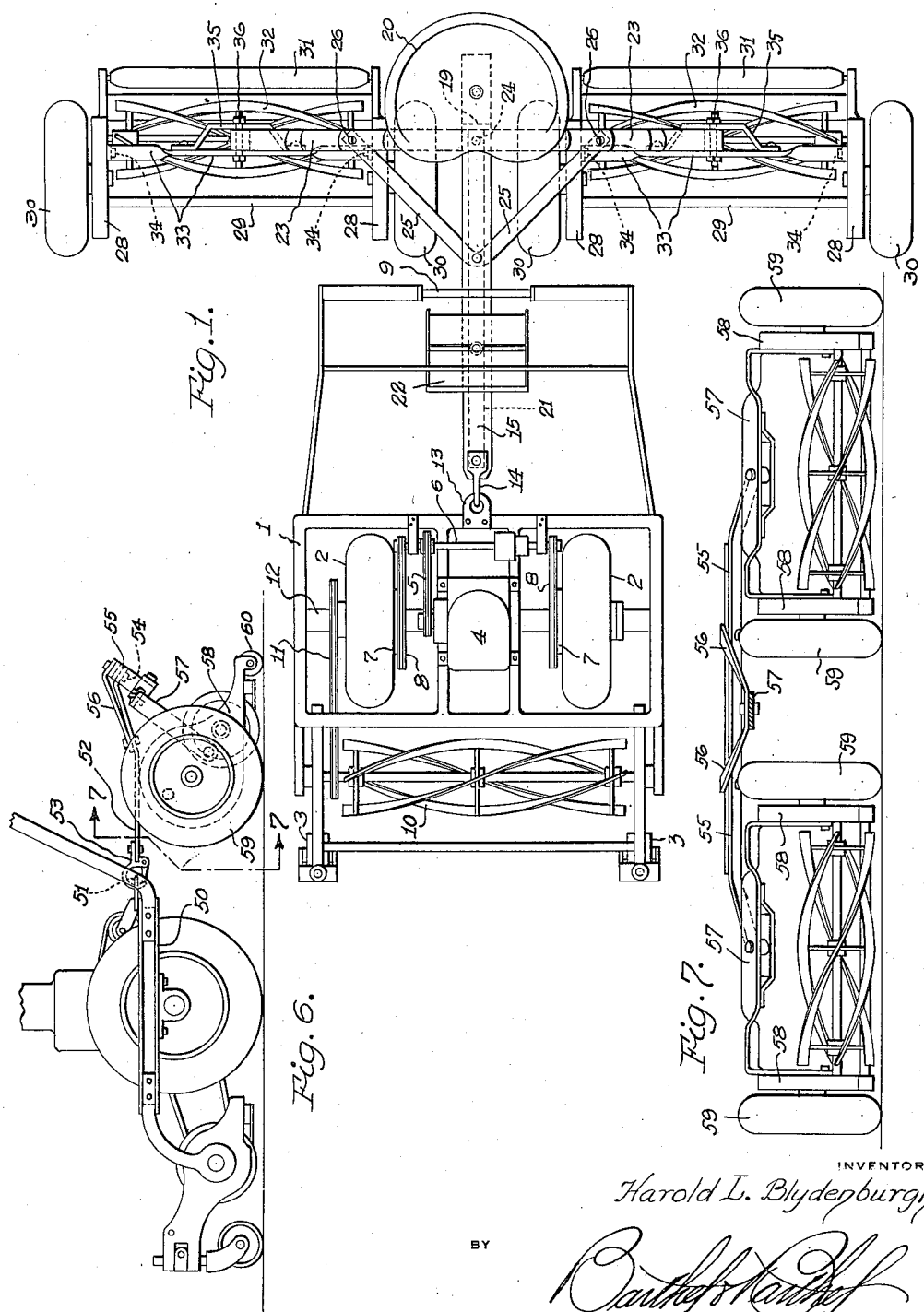

2,130,116

UNITED STATES PATENT OFFICE 2,130,116

LAWN MOWER HITCH

Harold L. Blydenburgh, Highland Park, Mich., assignor to The Moto-Mower Co., Detroit, Mich., a corporation of Michigan Application September 14, 1936, Serial No. 100,658

6 Claims. (Cl. 56—7)

The present invention relates to power lawn mowers, and more particularly to mowers of the type wherein the cutting capacity is increased by the addition of trailer type cutting units.

The primary object of the present invention is to provide a hitch device for connecting a pair of trailer type lawn mower cutting units to a powered lawn mower cutting unit, without detracting materially from the facility with which the power mower may be handled and its smoothness of operation and, further, permitting a freedom of movement of the trailing units whereby they may conform to different surface contours or irregularities.

Another object of the present invention is to provide a hitch device for connecting a pair of trailer type lawn mower units to a powered lawn mower cutting unit embodying a draw bar construction which exerts a downward thrust on the trailer cutting units so as to prevent bobbing of the trailer cutting units. In other words, the present hitch device connects the trailer cutting units to the power cutting unit in a manner whereby the pull of the hitch device sets up a thrust similar to the thrust given a conventional lawn mower by a person pushing on the handle thereof.

Still another object of the present invention is to provide a hitch device for the purpose above referred to, having a seat upon which the operator may ride, the hitch device being so constructed and arranged that the entire weight thereof and the weight of the operator tend to prevent bobbing of the rear of the trailer cutting units.

With the above and other ends in view the invention consists in matters hereinafter set forth with reference to the accompanying drawings, in which Figure 1 is a plan of a powered cutting unit with a pair of trailer units connected thereto by the present hitch device;

Fig. 2 is a side elevation thereof;

Fig. 3 is a view taken on the line 3—3 of Fig. 2;

Fig. 4 is a fragmental plan illustrating a detail;

Fig. 5 is a section of said detail;

Fig. 6 is a side elevation of a modified form, and

Fig. 7 is a view taken on the line 7—7 of Fig. 6.

Like characters of reference are employed throughout to designate corresponding parts.

The power cutting unit comprises a frame 1 supported by two main wheels 2 and two swivelled caster wheels 3. Upon the frame 1 is a power plant 4 in the form of an internal combustion engine, which is operatively connected through a flexible drive element 5 to a lay shaft 6. Two individually operable clutches 7 are connected to the lay shaft 6 by flexible drive elements 8 and are adapted to provide driving connections between the lay shaft and the two wheels 2. This drive structure is already known to the art, it being disclosed in Patent No. 2,041,126 issued May 19, 1936, and is not, therefore, shown in detail here. It will be understood, however, that the clutches 7 are controlled from the usual handle bar 9 so that the weels 2 may be selectively or simultaneously driven. Further, as is also known to the art, a cutting reel 10 supported in the forward part of the frame 1, is connected by a flexible drive element 11 to a shaft 12 which is connected to or forms the constantly rotating part of one of the clutches 7. A clutch (not shown) such as is usually employed in machines of this character may be employed to connect and disconnect the cutting reel from the driven element 12.

Attached to a rear portion of the frame 1 is a bracket 13 having an opening therein for receiving a hook 14 on a draw bar 15, the hook having a safety catch, in the form of a pivoted finger 16, adapted to prevent accidental displacement of the hook from the bracket 13. As may be seen upon reference to Fig. 2, the draw bar 15 is formed of a continuous strap-like metal body which is inclined upwardly at 17, horizontally at 18, and vertically at 19 to provide a support for an operator's seat 20. The draw bar is reinforced by a second metal element 21 and a foot rest 22 is mounted thereon.

Attached to the horizontal portion 18 of the draw bar is a transverse leaf spring 23, the spring being secured to the draw bar firmly by a bolt 24. Two angular braces 25 have ends thereof attached to the horizontal portion 18 of the draw bar and their other ends attached to the springs by means which is shown in detail in Figs. 4 and 5. As shown, this means comprises a bolt 26 which firmly ties the respective braces 25 to the lowermost leaf 23a of the spring 23, the bolt having a head 26 disposed in a slot 27 in the other leaves 23b. Relative lengthwise movement between the several leaves of the spring 23 is therefore permitted, and in order to prevent relative movement of the leaves laterally the slot 27 is so proportioned that its sides bear against the head 26, as shown more clearly in Fig. 4.

In the embodiment here shown two identical trailer type cutting units are provided, each unit comprising side frame members 28 united by transverse frame members 29, the frames thus provided being supported by forwardly disposed wheels 30 and rollers 31 at the rear thereof. Each frame supports a reel 32, and although it is not illustrated here, the reel 32 is connected by suitable drive elements or gears to the wheels 30 so that rotation of the reels is caused by rotation of the wheels. Pivotally attached to each pair of side frame members 28 is a U-shaped yoke 33, the yoke being attached to its respective frame members by studs 34. As may be seen upon reference to Figs. 1 and 3, the studs 34 are disposed in a vertical plane between the axes of rotation of the wheels 30 and the rollers 31, and in a horizontal plane lower than the axes of the wheels 30. Attached to the transverse runs of the yokes 33 are brackets 35 and opposite ends of the spring 23 are attached to respective brackets and transverse runs by bolts 36.

Due to the disposition of the studs 34 as above described the weight of the draw bar, the spring 23 and the operator riding on the seat 20 is imposed upon the frame members in a manner tending to cause rotation thereof about the axes of the wheels 30, the direction of such rotative tendency being such as to force the trailing rollers 31 more firmly into engagement with the ground and to thus maintain the reels 32 properly spaced with respect to the ground for efficient and uniform cutting. The ordinary tendency for the trailing cutters to bob at the rear is thus eliminated.

As shown by way of modification, the present hitch device is also adapted to prevent bobbing of the trailing cutting units in cases where no provision is made for the operator riding, in which case the weight of the operator is not present to hold the trailing units properly disposed with respect to the ground. This modified form is shown in Figs. 6 and 7 wherein there is shown a power cutting unit, similar to that above described and already known to the art, the power mower having a frame 50 with a bracket 51 at the rear thereof. A draw bar 52 has a hook 53 engaging the bracket 51 and is attached, by a bolt 54, to a leaf spring 55. Two angular braces 56 are attached to the draw bar at a common point and to the spring 55 at points spaced outwardly on opposite sides of the draw bar. Attached to opposite ends of the spring 55 are yokes 57 which are connected to frames 58 of trailer cutting units between the axes of the wheels 59 thereon and the rearwardly disposed rollers 60.

The connection of the draw bar 52 to the trailer cutting units is, therefore, similar to that above described, but it will be noted, upon reference to the drawings, that the draw bar supports the spring 55 in an angular position so that the yokes 57 extend in an oblique plane. The thrust which is exerted upon the trailing unit frames 58 is directed downwardly at the same time it is directly forwardly upon actuation of the power unit, and the direction of the thrust is such that it tends to firmly press the trailing units into proper engagement with the ground. The thrust of the draw bar is transmitted to the trailer cutting units in a manner similar to the thrust exerted on a hand operated lawn mower by a person pushing on the handle thereof.

Although specific embodiments of the invention have been illustrated and described it will be understood that various changes may be made within the scope of the appended claims without departing from the spirit of the invention, and such changes are contemplated.

What I claim is:—

1. A lawn mower hitch for connecting a power mower and a pair of trailer mower units, wherein each unit comprises a frame supported by fore and aft rolling elements, said hitch comprising yokes adapted to be attached to respective frames between their fore and after rolling elements, a drag link, means adapted to removably connect said drag link to said power mower, and resilient means connecting said drag link to said yokes, said resilient means being disposed whereby it supports said yokes in an oblique position whereby the thrust exerted therethrough from said drag link to said frames is in a forward and downward direction.

2. A lawn mower hitch for connecting a power mower and a pair of trailer mower units, wherein each unit comprises a frame supported by fore and aft rolling elements, said hitch comprising yokes adapted to be attached to respective frames between their fore and aft rolling elements, a drag link adapted to be connected to said power mower, resilient means connecting said drag link to said yokes, and a seat for the operator carried by said drag link and resilient means.

3. A lawn mower hitch for connecting a power mower and a pair of trailer mower units, wherein each unit comprises a frame supported by fore and aft rolling elements, said hitch comprising yokes adapted to be attached to respective frames between their fore and aft rolling elements, a drag link adapted to be connected to said power mower, and a transversely extending leaf spring attached to the end of said drag link and having its opposite ends connected to respective yokes.

4. A lawn mower hitch for connecting a power mower and a pair of trailer mower units, wherein each unit comprises a frame supported by fore and aft rolling elements, said hitch comprising yokes adapted to be attached to respective frames between their fore and aft rolling elements, a drag link adapted to be connected to said power mower, and a transversely extending leaf spring attached to the ends of said drag link and having its opposite ends connected to respective yokes, said spring being supported by said drag link in a position holding said yokes inclined whereby the thrust exerted upon the frame of the trailer units is in a forward and downward direction.

5. A lawn mower hitch for connecting a power mower to a pair of trailer mower units, wherein each unit comprises a frame supported by fore and aft rolling elements, said hitch comprising yokes adapted to be attached to respective frames between their fore and aft rolling elements, a drag link adapted to be connected to said power mower, a transversely extending leaf spring attached to the ends of said drag link and having its opposite ends connected to respective yokes, and a seat on said drag link for the operator of said power mower arranged whereby the weight of the operator is transmitted through said yokes to the trailer unit frames.

6. A lawn mower hitch for connecting a power mower and a plurality of trailer mower units, wherein each trailer unit comprises a frame supported by wheels at the front thereof and rollers at the rear, comprising a drag member extending transversely of the direction of travel of the mower units and in a plane above the trailer mower units, elements attached to said drag member and extending downwardly from said drag member and forwardly in the direction of travel of the mower units, and means connecting said elements to respective trailer unit frames at points between their supporting wheels and rollers.

HAROLD L. BLYDENBURGH.